Figure 1:
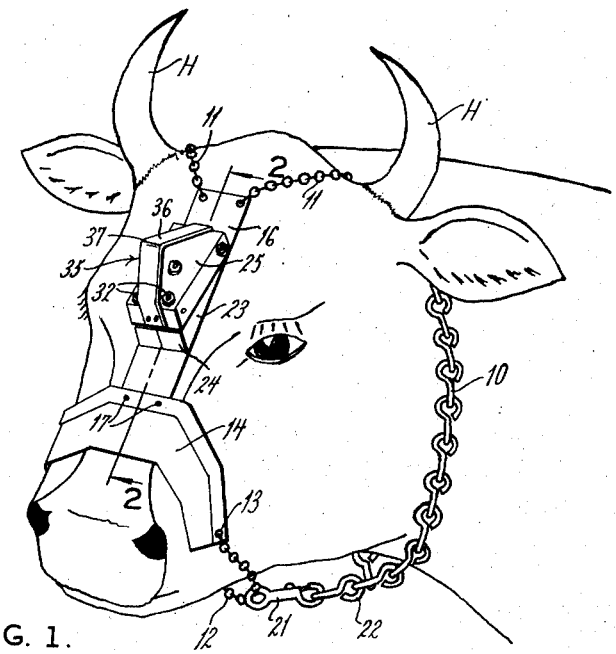

Sept. 4, 1951      R. E. WARMANN      2,566,437
BREACHING AND BUTTING CONTROL FOR CATTLE Filed Feb. 25, 1950

INVENTOR
ROLAND E. WARMANN

BY Terry & Cohn

ATTORNEYS

Patented Sept. 4, 1951

2,566,437

UNITED STATES PATENT OFFICE 2,566,437

BREACHING AND BUTTING CONTROL FOR CATTLE

Roland Emmet Warmann, Pershing, Mo.

Application February 25, 1950, Serial No. 146,331

2 Claims. (Cl. 119—142)

This invention relates to improvements in breaching and butting controls for cattle, and more particularly to a cattle-disciplining device operable automatically upon the application of frontal pressure to the head of a cow, steer, calf or other animal given to the use of movements of the neck and head as for butting or breaching purposes.

This applicant is aware that numerous devices have heretofore been designed for attachment to the heads of cattle for the purpose of inflicting thereon a mild degree of punishment responsive to undesired butting activities and fence-breaching movements. Such devices as have heretofore been available to the trade are, however, subject to numerous shortcomings, among which may be noted a difficulty of maintaining such a device effectively in position on the head of the animal for any period of time.

A further prevalent shortcoming of devices of earlier design for this purpose, is reflected in a short life of the device, due to its easy destruction; still others exhibit a tendency to become fouled or obstructed incident to a short period of normal usage on the animal, in such way that further effective actuation of the movable parts of the device becomes impossible. It is accordingly a general and important object of the present invention to obviate the aforesaid inadequacies of earlier designs, and to insure a longer life and more efficient operation of devices of this class.

The present invention may be summarized as including a special halter comprising a neck band and a nose band together with a rigid plate connected therebetween, on which plate is mounted and protectively enclosed, the self-operating punishment elements of the device. These latter include, in a preferred construction, a plurality of relatively sharp punishment elements which, incident to frontal impact of the head of the animal with some obstruction such as a fence or the like or another animal, will actuate such punishment elements in a progressive manner to provide, first, a relatively gentle deterring punishing effect, followed if the butting action be persisted in, by a more severe order of punishment. The enclosed punishment device is spring-equipped so as normally to be kept inoperative. Such device is further provided with a frontal extension of its outermost movable member, in order to render the device fully operative under all conditions even when fitted to horned cattle.

Still further objects realized in the present improvements, include a novel provision above generally referred to, of a movable punishment member, provided with serially actuable head-engaging apexed members whereby to provide a punishment or disciplining effect of progressive severity in deterring its breaching tendencies.

An additional object of the invention is realized in a combination in a supporting halter, of an improved centering arrangement for a frontal base plate, according to which a portion of the nose band of the halter is of preformed and relatively rigid construction.

Figure 2:
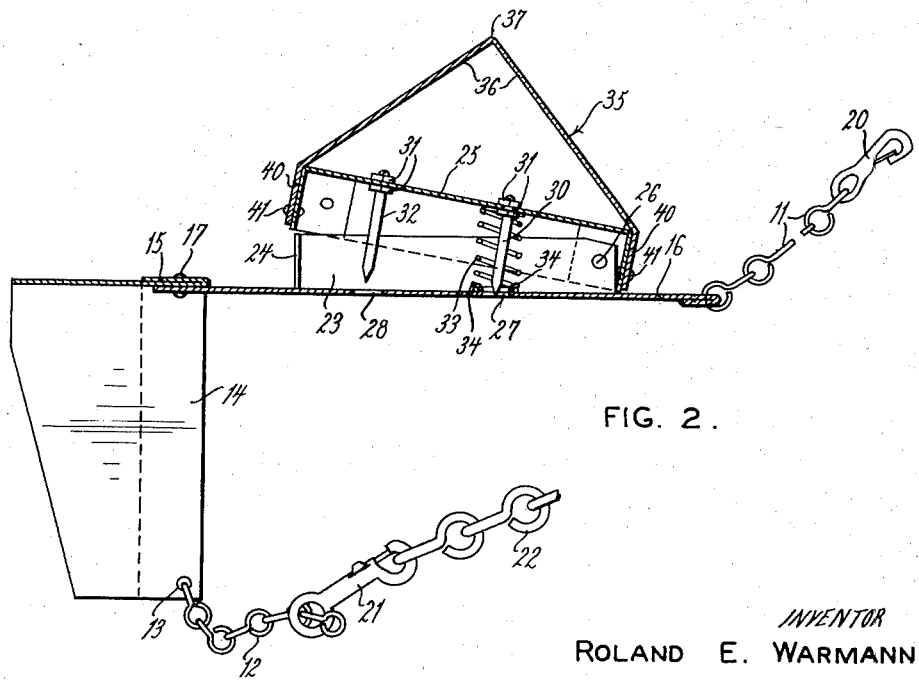

The foregoing and numerous other objects and advantages will more clearly appear from the following detailed description of a currently preferred embodiment, particularly when considered in connection with the accompanying drawing, in which:

Fig. 1 is a view in perspective of the device as applied to the head of an animal, and Fig. 2 is a considerably enlarged, longitudinal sectional view taken in a vertical median plane, and showing the internal features of the enclosed disciplining device.

Referring now by characters of reference to the drawing, there is shown in Fig. 1 a special halter construction embodying the present improvements, the halter elements comprising a neck band which in the present example consists of a chain 10, and which if desired, may extend fully about the neck of the animal. To the chain 10 is connected a pair of divergent lateral chains 11 the laterals being connected to the neck chain or band 10 at points somewhat between but rearwardly of the horns H of the animal. If desired, the elements 11 may consist of parts of chain 10.

The nose band of the halter is formed in part of a chain 12 normally extended beneath the lower jaw of the animal, and the ends of which are connected as through apertures 13, one of which is shown in Fig. 1 and the other in Fig. 2, to a relatively rigid, preformed sheet metal element 14. This latter is of inverted U shape, and its rigidity and shape are better maintained by a marginally folded portion 15 best appearing in Fig. 2. The shaped inverted U element is normally saddled over the nose of the animal and is maintained in such position partly by the chain 12 and partly by a flat mounting plate or base 16 which extends along the frontal or brow area of the animal, and which is connected at a right angle to the element 14, as through rivets 17 or otherwise as desired.

It will be understood that suitable fasteners such as harness snaps are provided at desired points, not all of which are shown by the drawing, but one of which is indicated at 20. These or equivalent fasteners will be located in each of the zones of connection between the lateral chains 11 and the chain forming the neck band proper 10. Still another such snap will usually be located as indicated at 21, which, together with such added links as may be necessary, forms a connection 22 extended rearwardly from the nose band to the neck band 10. Thus the major elements of the special halter as herein disclosed, are found in the parts 10, 12, 14, 16, 11 and 21—22.

Proceeding now more particularly to describe the disciplining device per se, it is greatly preferred to enclose the active operating elements thereof which are utilized for inflicting a degree of self-punishment upon the animal. For purposes of such enclosure there is provided a rectangular sheet-metal top-open box which may be welded or otherwise secured to the plate 16. The sides of this box are indicated at 23, and the one or more end elements thereof at 24, although if desired the uppermost end element may be omitted, as shown.

Depressibly superposed on the fixed box structure 23—24, is a similar inverted sheet metal structure, the most essential element of which is a planar top piece 25, the sides and ends of which are turned downwardly as will appear from Fig. 2, the sides being apertured somewhat inwardly of the rear or uppermost ends, for the reception of a pivot pin 26, this latter extending through similar registering apertures in the sides 23 of the fixed box structure. It will now clearly appear that the plate 25 with its formed sides and ends, constitutes in effect a depressible cover for the fixed box, and is susceptible of a few degrees of pivotal movement about an axis defined by the rod or pin 26.

The base plate 16 is provided with a plurality of apertures, one of which is indicated at 27, and by preference a pair of additional such apertures, one of which appears in Fig. 2 as indicated at 28. These as will be noted, are more widely spaced from the pivot pin 26 for a reason later appearing.

Detachably and dependingly supported by the plate 25 is a threaded apexed element such as a spike 30, the uppermost end of which is threaded to receive a pair of holding nuts 31, one above and one below the plate 25. A pair of similar apexed elements are carried more remotely from the pivot 26, and one of which is shown at 32, and also threaded and provided with assembly nuts 31. Preferably two of the spikes 32 are employed, spaced somewhat laterally of a longitudinal median plane through the elements 16, 25, etc. Held captive by and operable between the elements 16 and 25, is a coil compression spring 33, the lowermost coil of which is partly embraced by upstruck ears 34 formed of the metal displaced from the area of aperture 27. The uppermost end of the spring is preferably anchored as by an inturned tang (not shown) held under the lowermost nut 31 on the element 30, or otherwise attached, as may be desired, to the plate 25.

In certain older forms of inhibiting or disciplining devices the movable members are open laterally, and thus at times will receive and be closed over one or more strands of barb wire, fence wire and the like, sometimes destructively to the fencing and with serious injury to the animal. Open types of devices of this kind sometimes tend to become fouled with grass, brush and other materials to an extent they become choked and useless. The present full enclosure of the spikes, spring and other movable parts fully obviate the noted difficulties.

The device as thus far described is fully operative under all conditions for dehorned cattle, or for calves and other butting animals such as goats. However, in the case of cattle whose horns are normally or abnormally extended forwardly of the frontal or brow region of the head, it is advisable to augment the extent of outward projection of the movable punishment structure, but for which provision, harmful goring or other head activities of the animal might occur prior to effect of the disciplining device. In the present example, such extension consists of an inverted V shaped element indicated generally at 35, and which consists of a pair of planar portions 36 connected in a blunt frontal apex portion 37. The innermost or lowermost ends 40 of the member 35, which may be formed of steel strip, are bent to substantial parallelism and are attached as by rivets 41 to the ends of the inverted movable box structure. It may be noted that, in case the extension 35 encounters a fence, barb wire or the like, the upwardly and downwardly pitched portions 36 will, with the apex 37, serve to deflect such a wire away from the punishment device in a manner tending to prevent fouling of the device or injury to the animal by the wire or other obstruction.

The advantages and operation of the device are thought now to have become fully apparent from the foregoing description of structure, but it may be noted for completeness that under all conditions of normal behavior of the animal wearing the halter equipped with the disciplining device, no punishment will be inflicted on the animal and no discomfort incurred. The device is or may be of light weight, and in no way impairs vision, eating, breathing or other normal activities of the animal. When, however, the animal attempts to gore or butt another animal, or attempts to breach a fence, wire or other confining structure, it will appear that a relatively light frontal pressure or impact upon the plate 25 or upon the extension 35 if utilized, will serve to rock the plate 25 and therewith the apexed members 30 and 32 in a counterclockwise direction through an arc about the axis identified with pin 26, and against the loading of spring 33. The first effect will be a relatively gentle deterring action of the spike 30 operating through aperture 27 into engagement with the forehead of the animal. Due to the adacent bone structure in this region, usually no serious extent of penetration of or damage to the flesh, will occur. If, however, such unwanted activity is persisted in, still further pressure upon the element 35 or 25 will cause such an extent of movement in a counterclockwise direction (Fig. 2) of plate 25 about pivot 26 as to bring into effect as punishment elements, the pair of spikes 32. It is obvious that the immediate reactive effect on the animal by reason of its usual reflexes, is a withdrawal of the head, and a cessation of any such activity, inasmuch as the disciplining action of the device inflicts automatically the indicated punishment. It will now have become obvious that, if desired, the spikes 30 and 32 may be of different length, and that whether of the same or of different length, the threaded shanks and the nuts 31 will enable a degree of length adjustment, hence a control of the progression or phases of disciplining effect.

Experience has shown that after a relatively few punishment experiences of the kind noted, the animal soon learns to avoid any butting, breaching or other activities which would bring the device into play, and that in most cases, following a short educative period, the device may be transferred to other animals without loss of the disciplining effect.

Although the invention has been described by making a particularized reference to a preferred form of the device, the detail of description should be understood solely in an informative, rather than in any restrictive sense, numerous variants being possible within the full intended scope of the claims hereunto appended.

I claim as my invention:

1. In a cattle inhibiting device for use in disciplining against breaching and butting activities, a halter, a metal plate longitudinally connecting neck and nose portions of the halter, said plate having an aperture therethrough, a metal box attached to said plate, a depressible cover on said box, a pivot pin connecting corresponding ends of the cover and box, a pointed punishment element dependingly supported from the cover and adapted to extend through the aperture in said rigid plate and into engagement with the head of the animal, a spring in the box and cover, urging same apart, an inverted V-shaped extension having its otherwise free ends attached to the ends of the cover of the box, and providing a sloping abutment extension outwardly of the box, the nose portion of the halter including a rigid, inverted U-shaped element normally saddled over the nose of the animal and constituting a portion of the lower band structure of the halter.

2. In a cattle inhibiting device for use in disciplining against breaching and butting activities, a halter, a metal plate longitudinally connecting neck and nose portions of the halter, said plate having a plurality of apertures therethrough, a metal box attached to said plate, a depressible cover on said box, a pivot pin connecting corresponding ends of the cover and box, a plurality of pointed punishment elements dependingly supported from the cover and spaced substantially in a line transverse to the pivot pin at different distances therefrom, the punishment elements adapted to extend through the respective apertures in said rigid plate and sequentially into engagement with the head of the animal, a spring in the box and cover urging same apart, the box and cover being so related as fully to shroud the spring and punishment elements at all times, an inverted V-shaped extension having its otherwise free ends attached to the ends of the cover of the box, and providing a sloping abutment extension outwardly of the box, the nose portion of the halter including a rigid, inverted U-shaped element normally saddled over the nose of the animal and constituting a portion of the lower band structure of the halter.

ROLAND EMMET WARMANN.

REFERENCES CITED

The following references are of record in the file of this patent:

UNITED STATES PATENTS

| Number | Name | Date |
|---|---|---|
| 211,402 | Hawley | Jan. 14, 1879 |
| 350,380 | Medling | Oct. 5, 1886 |
| 483,190 | Whallon | Sept. 27, 1892 |
| 915,409 | Blackburn | Mar. 16, 1909 |
| 1,057,615 | Blackburn | Apr. 1, 1913 |
| 1,517,140 | Yoder | Nov. 25, 1924 |
| 1,691,471 | Fischer | Nov. 13, 1928 |
| 2,040,410 | Sacker | May 12, 1936 |
| 2,159,441 | Marty | May 23, 1939 |